INVENTOR.
Richard C. Lundquist

Sept. 17, 1963  R. C. LUNDQUIST  3,104,003
BUMPER CONSTRUCTION

Filed April 29, 1960  3 Sheets-Sheet 2

INVENTOR.
Richard C. Lundquist
BY

Sept. 17, 1963 R. C. LUNDQUIST 3,104,003
BUMPER CONSTRUCTION
Filed April 29, 1960 3 Sheets-Sheet 3
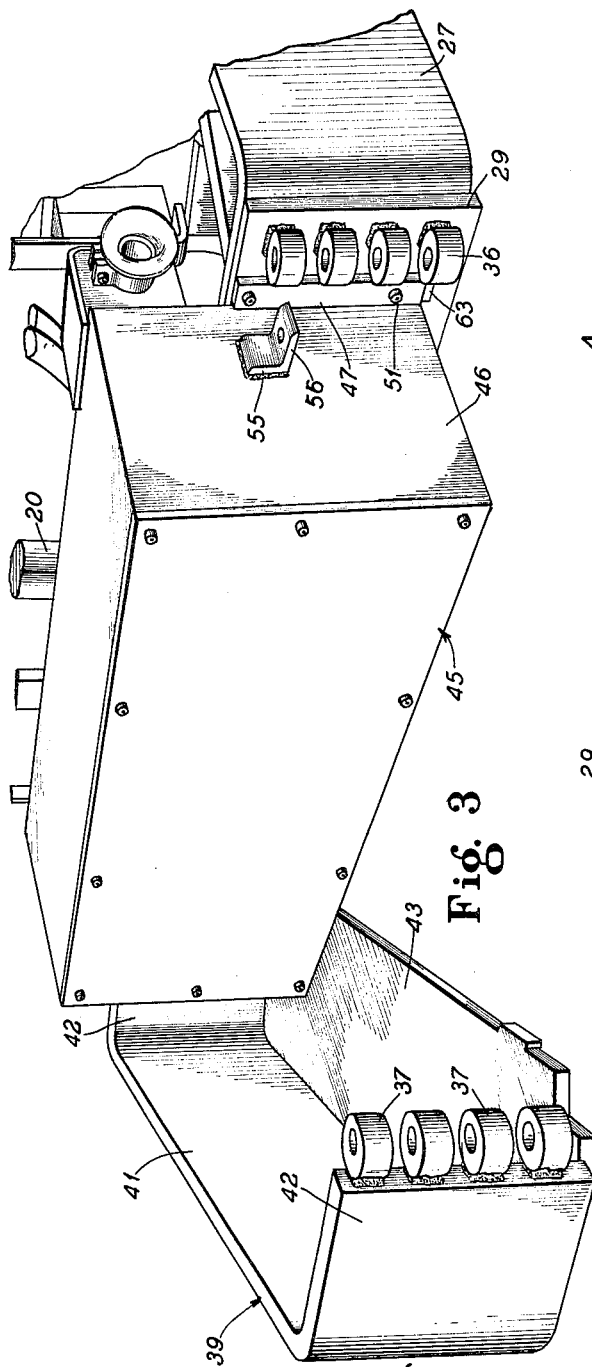
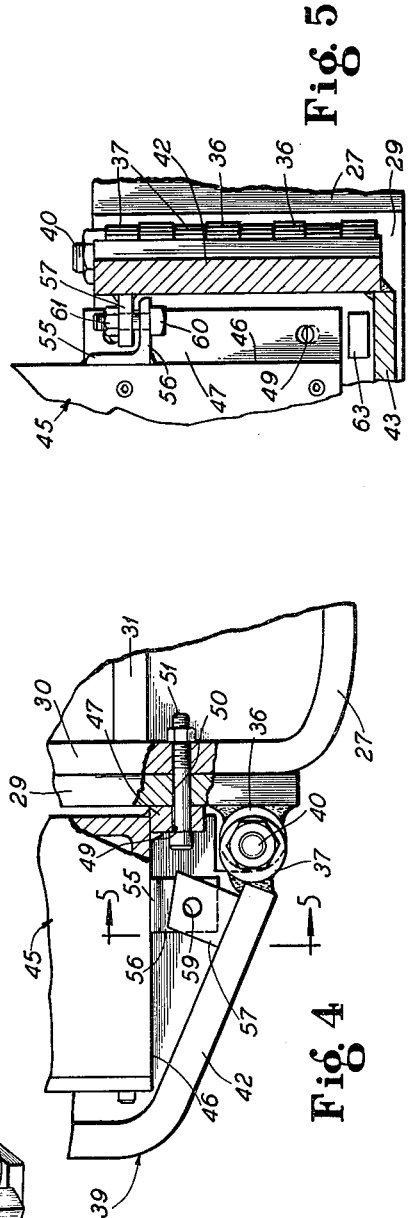
INVENTOR.
Richard C. Lundquist United States Patent Office 3,104,003
Patented Sept. 17, 1963

3,104,003
BUMPER CONSTRUCTION
Richard C. Lundquist, Palos Heights, Ill., assignor to Goodman Manufacturing Company, Chicago, Ill., a corporation of Illinois
Filed Apr. 29, 1960, Ser. No. 25,567
5 Claims. (Cl. 198—1)

This invention relates to improvements in continuous mining machines and the like and more particularly relates to an improved control casing support and protective bumper structure therefor.

In continuous mining machines, loading machines and like machines operable in confined spaces underground, the machines are of necessity relatively complicated and the motors and much of the operating and control mechanism for the machine is covered by the machine conveyor and main frame of the machine and is not readily accessible except through the rear end of the machine. Such machines are also usually controlled by a system of contactors contained in a casing mounted to one side of the machine, or across the rear end of the machine, or supported on a trailer truck separate from the machine and trailed behind the machine.

Due to the confined working space in which the machine operates and the fact that the contactor casing is large and bulky, it is not always desirable to mount the contactor casing to one side of the machine, since it unduly increases the width of the machine and obscures the view of the working face from the operator of the machine.

The mounting of the contactor casing on a separate trailer also is not desirable particularly where mine or shuttle cars are moved under the discharge end of the conveyor and frequently bump the trailer and cause damage to the contactor casing and contactors contained therein.

The same objection applies where the contactor casing is mounted to the rear of the machine, and in addition either the contactor casing or conveyor must be removed from the machine to afford access to the operating and control parts for the machine.

My invention, accordingly, has as its principal objects to remedy the foregoing difficulties by protecting the contactor casing at the rear of the machine by a bumper and by so constructing and arranging the bumper as to accommodate movement of the bumper and contactor casing away from the rear of the machine to afford access to the operating and control mechanism at the rear of the machine.

Another object of the invention is to provide an improved bumper construction for mining machines operable in confined spaces underground protecting the control casing for controlling operation of the machine and forming a movable support therefor to accommodate the control casing to be moved to one side of the machine to afford access to the operating and control mechanism in advance of the control casing.

Still another object of the invention is to provide an improved hinged bumper construction for continuous mining machines and the like accommodating ready access to the operating and control mechanism for the machine.

These and other objects of the invention will appear from time to time as the following specification proceeds and with reference to the accompanying drawings wherein:

FIGURE 3 is a fragmentary perspective view looking toward the rear end portion of the machine showing the bumper swung outwardly and the contactor casing in position across the rear end portion of the machine;

Figure 1:
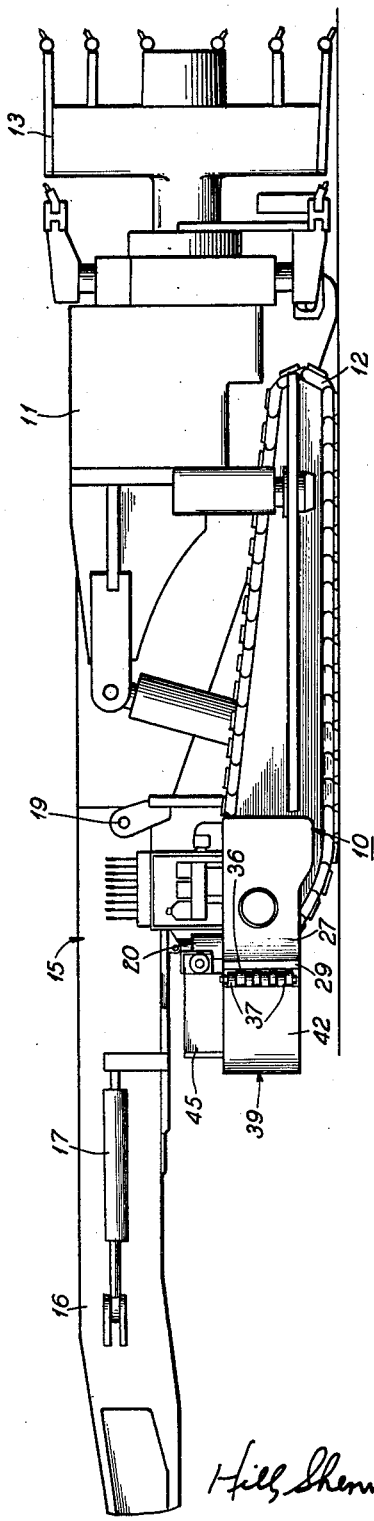
FIGURE 1 is a view in side elevation of a continuous mining machine having a bumper construction constructed in accordance with the principles of the present invention protecting the rear end of the machine.

FIGURE 4 is an enlarged fragmentary plan view with certain parts broken away and certain other parts shown in horizontal section in order to illustrate the supporting connection between the contactor casing and the main frame of the machine; and FIGURE 5 is a fragmentary vertical sectional view looking substantially along line 5—5 of FIGURE 4, but showing the position of the contactor casing when supported by the bumper and prior to mounting on the main frame of the machine.

In the embodiment of the invention illustrated in the drawings, 10 generally designates a main frame of the machine having a cutter frame 11 supported thereon and extending in advance thereof, and mounted on the main frame 10 for vertical adjustment with respect thereto and for angular adjustment about axes extending transversely and longitudinally of said main frame, in a conventional manner.

The main frame 10 is supported on continuous laterally spaced traction tread devices 12, which serve to transport the machine along the ground from working place to working place and to propel the machine at a low feeding speed to feed rotary boring heads 13 at the front of the machine, and mounted on and projecting forwardly of the cutter frame 11, to cut contiguous bores in the working face in a manner well known to those skilled in the art, so not herein shown or described further.

An endless conveyor 15 extends along the main frame 10 from a position adjacent the ground in advance of said main frame, rearwardly of the boring heads 13, to pick up the mined material and load the mined material into shuttle cars, conveyors or the like.

The conveyor 15 may be a laterally flexible center strand chain and flight type of conveyor of a well known form and has a laterally flexible discharge end portion 16 moved from side to side and held in the desired position of adjustment by hydraulic jacks 17.

The laterally flexible rear end portion 16 of the conveyor is also vertically adjustable about pivot pins 19 by operation of a vertically extending hydraulic jack 20 transversely pivoted to the rear end portion of the main frame 10 adjacent the bottom thereof and transversely pivoted to lugs 21 depending from a support plate 22 for the conveyor, on a transverse pivot pin 23. The main frame 10 also has a motor 24 at the rear end thereof for driving transmission gearing (not shown) in a gear casing 25 for driving certain operative parts of the machine and not herein shown or described, since the drive mechanism is no part of the present invention.

The main frame 10 has opposite side frame members 27 extending along the rear portion thereof and turned inwardly at the rear end portion thereof and forming a support for a plate 29 extending across the rear end portion of the machine and forming a secondary bumper therefor. Inwardly turned end portions 30 of the side frame members 27 are braced by bracing plates 31. The bracing plates 31 extend forwardly from said inwardly turned end portions and diagonally outwardly to the insides of the side frame members 27 and are welded or otherwise secured to said inturned end portions and said side frame members.

The plate or secondary bumper 29 has a cut away portion 35 intermediate the ends thereof affording access to the hydraulic jack 20 and to the motor 24 and transmission casing 25. The secondary bumper 29 also has a series of parallel spaced and aligned apertured bosses 36 welded or otherwise secured to the rear end portion thereof and extending rearwardly therefrom and adapted to be interleaved by a series of corresponding apertured bosses 37 extending forwardly from opposite sides of the forward end portions of a primary bumper 39. Pivot pins 40 herein shown as being in the form of bolts extend through the aligned apertures of the bosses 36 and 37, when interleaved, to retain the primary bumper 39 in the position shown in FIGURE 1 and to accommodate hinging of said primary bumper outwardly of the secondary bumper 29, to afford access to the hydraulic jack 20, motor 24 and other operating and control mechanism at the rear end of the machine.

The primary bumper 39 has a rear wall 41, opposite side walls 42 from which the bosses 37 extend and a bottom plate 43 extending between said side walls and extending forwardly from the rear wall and forming a stiffener for the bumper and a protecting plate for the bottom of a casing 45 for control mechanism, such as contactors controlling operation of the electrical parts of the machine.

The contactor casing 45 is shown as being generally rectangular in form and as having opposite side walls 46 having vertically extending bars 47 extending laterally from the forward end portions thereof and adapted to abut the plate or secondary bumper 29, when the contactor casing 45 is in the position shown in FIGURES 3 and 4.

The bars 47 have spaced apertures 49 extending therethrough adapted to register with apertures 50 in the secondary bumper 29 to accommodate through bolts 51 to secure the contactor casing to the secondary bumper 29 during operation of the machine. The side walls 46 of the contactor casing 45 have angles 55 welded thereto having horizontal legs 56 extending horizontally therefrom. The angles 55 and horizontal legs 56 thereof are spaced a substantial distance about the bottom of the contactor casing 45 and the horizontal legs 56 underlap ears 57 extending inwardly from the side walls 42 of the primary bumper 39 and welded or otherwise secured to said side walls.

When the primary bumper 39 is in the closed position shown in FIGURE 4, the apertures 59 in the ears 57 will register with corresponding apertures in the horizontal legs of the angles 55, to receive bolts 60 having nuts 61 threaded thereon (FIGURE 5).

Figure 2:
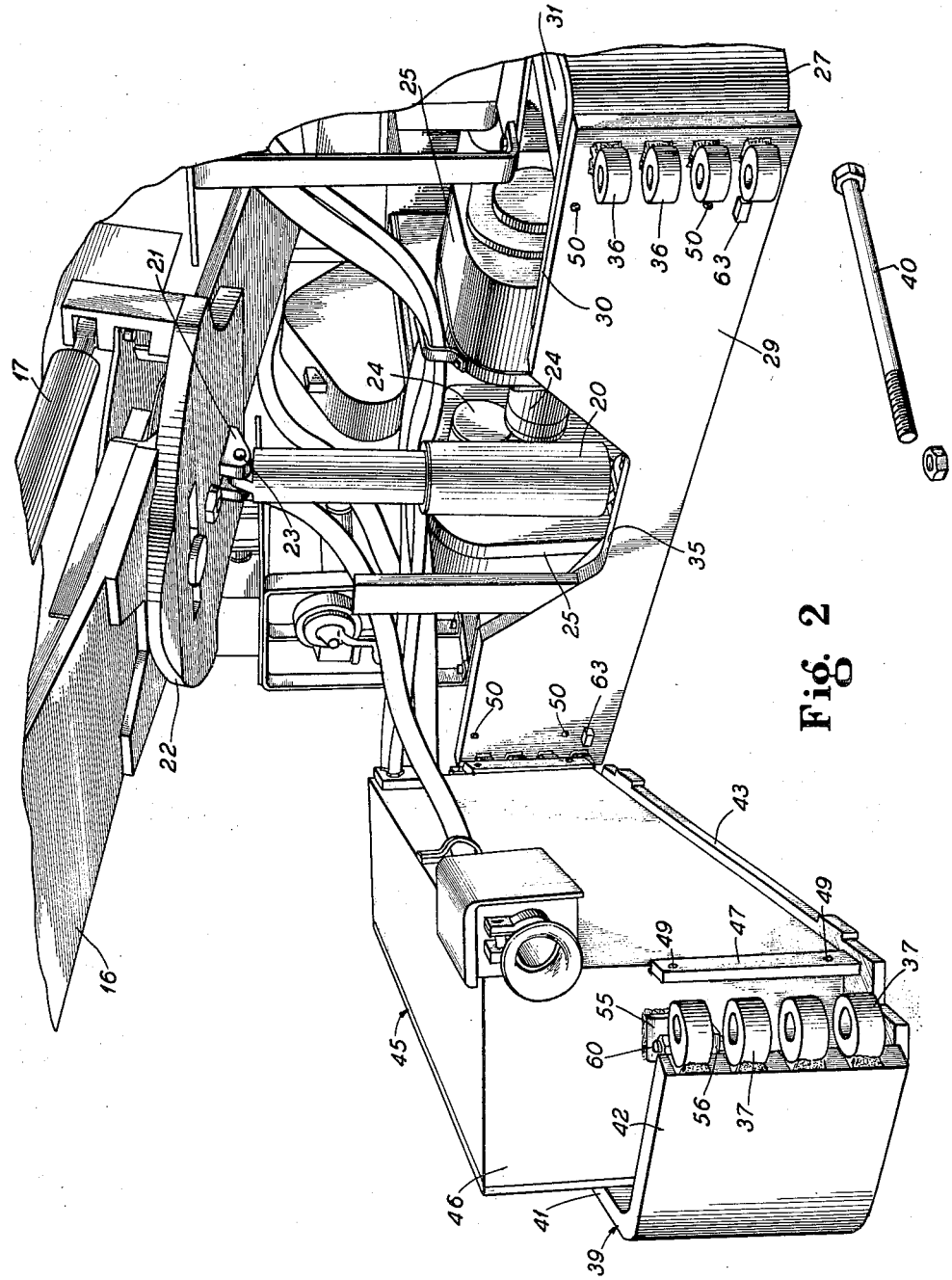
FIGURE 2 is a fragmentary perspective view of the rear end portion of the machine showing the bumper and contactor casing swung outwardly with respect to the machine to afford access to the operating and control mechanism therefor.

When the contactor casing 45 is bolted in position on the secondary bumper 29 and it is desired to swing the contactor casing 45 outwardly for access to the hydraulic jack 20, motor 24 and other operative parts of the machine, assuming the bolts 60 are placed through the registering apertures in the horizontal legs 56 of the angles 55 and the ears 57 and the nuts 61 are threaded thereon, the nuts 61 may be tightened to relieve stresses from the through bolts 51. The through bolts 51 are then removed from the secondary bumper and bars 47. One bolt or pin 40 may then be removed from the registering interleaved bosses 36 and 37. The nuts 61 may then be further tightened, to raise the bars 47 above alignment pads 63, as shown in FIGURE 5, to accommodate free outward swinging movement of the contactor casing with the primary bumper 39. The primary bumper 39 and contactor casing 45 may then be swung outwardly a distance sufficient to afford ready access to the various operating and control parts of the machine at the rear of the main frame 10, as shown in FIGURE 2.

When it is desired to close the primary bumper 39, said bumper may be swung to a closed position and locked in position by a pin 40, extending through the aligned apertured portions of the interleaved bosses 36 and 37. The nuts 61 may then be loosened until the bars 47 come into engagement with the top surfaces of the alignment pads 63. In this position of the bars 47, the apertures 49 will be in alignment with the apertures 50 and the through bolts 51 may be extended therethrough and the nuts thereon tightened to rigidly secure the contactor casing 45 to the secondary bumper 29.

In this position of the contactor casing and primary bumper 39, the contactor casing is rigidly mounted on the secondary bumper and the weight thereof is relieved from the primary bumper. The shock loads are then taken directly on the primary bumper which effectively protects the contactor casing and serves to absorb the shock loads on the machine.

While I have herein shown and described one form in which my invention may be embodied, it should be understood that various modifications and variations in the invention may be attained without departing from the spirit and scope of the novel concepts of the invention as defined by the claims appended hereto.

I claim as my invention:

1. A bumper construction for machines operable in confined spaces underground, such as mines, having certain operating and control mechanism at the rear of the machine and covered by certain operative structures of the machine, a main frame, a casing containing certain control elements for controlling certain operations of the machine, means for rigidly mounting said casing on said main frame to extend across the rear end thereof, a bumper spaced rearwardly of said casing and protecting said casing against shock, a pivotal support means for said bumper on said main frame accommodating horizontal swinging movement of said bumper away from said main frame, and means on said bumper relieving the weight of said casing from said main frame and accommodating the release of said casing from said main frame for support on said bumper upon swinging movement of said bumper outwardly with respect to said main frame, to thereby afford access to the operating and control mechanism for the machine at the rear end of said main frame.

2. A bumper construction for machines operable in confined spaces underground, such as mines, having a main frame, a conveyor extending along said main frame beyond the rear end thereof, hydraulic jack mechanism for elevating said conveyor, mounted at the rear end of said main frame beneath said conveyor, certain operating and control mechanism for the machine mounted at the rear end of said main frame beneath said conveyor, a secondary bumper extending across the rear end of said main frame, a casing containing certain mechanism for controlling certain operations of the machine, means for mounting said casing on said secondary bumper, a primary bumper for protecting said casing, means for movably mounting said primary bumper on said secondary bumper and for retaining said primary bumper in fixed relation with respect thereto, and means on said primary bumper relieving the weight of said casing from said secondary bumper and affording a support for said casing on said primary bumper during movement thereof away from said secondary bumper, and accommodating said primary bumper to move said casing away from said secondary bumper to afford access to said hydraulic jack mechanism and said operating and control mechanism for the machine.

3. A bumper structure in accordance with claim 2 wherein alignment pads are provided on the secondary bumper to accomodate alignment of the casing therewith, to be secured thereto, and wherein the means on the primary bumper relieving the weight of said casing from said secondary bumper also serves to lower said casing into engagement with said alignment pads to be secured to said secondary bumper, and also raises said casing above said alignment pads to be supported on said primary bumper.

4. A bumper construction for mobile mining machines and the like, having a main frame having a motor and mechanism driven by said motor at the rear of said main frame and having certain operative parts of the machine extending over said motor and mechanism, a secondary bumper extending across the rear of said main frame and fixedly mounted thereon, a casing containing certain control mechanism for controlling certain operations of the machine, extending rearwardly of and fixedly secured to said secondary bumper, a primary bumper extending along the rear and sides of said casing and beneath said casing, hinge means hinging said primary bumper to said secondary bumper to swing outwardly with respect thereto about either end thereof and including removable hinge pins hingedly securing said primary bumper to said secondary bumper, means on said primary bumper engageable with said casing for relieving the weight of said casing from said secondary bumper and supporting said casing on said primary bumper to be swung away from said secondary bumper with said primary bumper, to afford access to said motor and the drive mechanism at the rear of said main frame.

5. A bumper construction in accordance with claim 4 wherein alignment pads extend rearwardly of said secondary bumper and are engageable with said casing for aligning said casing with respect to said secondary bumper to be rigidly secured to said secondary bumper, and wherein the means on said primary bumper connected with said casing for removing the weight of said casing from said secondary bumper comprises ears at opposite sides of said primary bumper extending horizontally inwardly therefrom toward said casing, lugs extending from said casing in alignment with and spaced beneath said ears, and bolts supported on said lugs and extending through said ears for raising said casing above said alignment pads and supporting said casing on said secondary bumper and operable to lower said casing into engagement with said alignment pads to be secured to said secondary bumper.

References Cited in the file of this patent

UNITED STATES PATENTS

| | | |
|---|---|---|
| 1,652,895 | Hedglon | Dec. 13, 1927 |
| 2,642,981 | Lindgren | June 23, 1953 |
| 2,959,425 | Rogan | Nov. 8, 1960 |

FOREIGN PATENTS

| | | |
|---|---|---|
| 1,131,786 | France | Feb. 27, 1957 |